United States Patent
Horváth

(10) Patent No.: US 10,609,929 B2
(45) Date of Patent: Apr. 7, 2020

(54) PLANT CONDITIONING COMPOSITION COMPRISING WATER-BASED AND NATURAL OIL-BASED PLANT EXTRACTS

(71) Applicant: OGET INNOVATIONS GMBH, Allerheiligen Bei Wildon (AT)

(72) Inventor: András Horváth, Nagyhalasz (HU)

(73) Assignee: OGET INNOVATIONS GMBH, Allerheiligen bei Wildon (AT)

( * ) Notice: Subject to any disclaimer, the term of this patent is extended or adjusted under 35 U.S.C. 154(b) by 50 days.

(21) Appl. No.: 15/743,351

(22) PCT Filed: Jul. 12, 2016

(86) PCT No.: PCT/EP2016/066564
§ 371 (c)(1),
(2) Date: Jan. 10, 2018

(87) PCT Pub. No.: WO2017/009350
PCT Pub. Date: Jan. 19, 2017

(65) Prior Publication Data
US 2018/0192653 A1   Jul. 12, 2018

(30) Foreign Application Priority Data
Jul. 13, 2015   (LU) .......................... 92774

(51) Int. Cl.
*A61K 36/76* (2006.01)
*A01N 65/00* (2009.01)
*A01N 37/40* (2006.01)

(52) U.S. Cl.
CPC ............. *A01N 65/00* (2013.01); *A01N 37/40* (2013.01)

(58) Field of Classification Search
None
See application file for complete search history.

(56) References Cited

U.S. PATENT DOCUMENTS

| | | | |
|---|---|---|---|
| 5,201,937 A | 4/1993 | Rheinheimer et al. | |
| 6,579,543 B1 | 6/2003 | McClung | |
| 2010/0324152 A1* | 12/2010 | Schmaus | A61K 8/345 514/738 |

FOREIGN PATENT DOCUMENTS

| | | | |
|---|---|---|---|
| DK | 2006 00154 U3 * | 5/2006 | |
| DK | 200600154 | 9/2007 | |
| DK | 200600156 U3 | 9/2007 | |
| DK | 2006000156 U3 * | 9/2007 | |
| EP | 0 527 378 A1 | 2/1993 | |
| EP | 0 527 378 B1 | 2/1993 | |
| FR | 3031006 A1 * | 7/2016 | |
| GB | 2-352-397 | 1/2001 | |
| HU | 214217 * | 3/1993 | |
| HU | 207855 * | 6/1993 | |
| HU | 220582 * | 4/1995 | |
| HU | P0304107 A2 | 11/2005 | |
| WO | WO-99/56538 A1 | 11/1999 | |
| WO | WO-2006/097700 A1 | 9/2006 | |
| WO | WO-2010/150034 A2 | 12/2010 | |
| WO | WO 2010/150034 A2 * | 12/2010 | |
| WO | WO-2010/150034 A3 | 12/2010 | |

OTHER PUBLICATIONS

Ali, A. et al. Effect of Natural and Chemical Insecticides on Hyalopterus pruni and Armeniaca vulgaris. African J of Biotechnology 7(12)1865-1869, Jun. 17, 2008. (Year: 2008).*
Bowers, JH.et al., (2004). "Effect of Formulated Plant Extracts and Oils in Population Density of *Phytophthora nicotianae* in Soil and Control of Phytophthora Blight in the Greenhouse" 2004 *Plant Disease* 88(1):11-16.
Craigie JS, (2011). "Seaweed Extract Stimuli in Plant Science and Agriculture" *J. Appl. Phycol.* 23:371-393.
Patel, PN. et al., (Sep. 5, 2011). "Extraction of Herbal Aroma Oils from Solid Surface" Review Article. *Pharmacie Globale (IJCP)* 2(8):1-10.
Archbold, D.D. et al. (1997). "Identifying Natural Volatile Compounds That Control Gray Mold (*Botrytis cinerea*) during Postharvest Storage of Strawberry, Blackberry, and Grape," 45(10):4032-4037.
Dagostin, S. et al. (Jan. 1, 2008). "Replacement of Copper in Organic Viticulture; Efficacy Evaluation of New Natural Fungicides against Downy Mildew," *Integrated Protection in Viticulture* 36:87-90.
Hayat, Q. et al. (Mar. 1, 2010). "Effect of Exogenous Salicylic Acid Under Changing Environment: A Review," *Environmental and Experimental Botany* 68(1):14-25.
International Search Report dated Aug. 19, 2016, for PCT Application No. PCT/EP2016/066564, 8 pages.
Sapkota, T.B. et al. (Jan. 1, 2002). "Potential Use of Nettle (*Urtica dioica* L.) Extracts for Management of Alternaria Blight of Radish," *Tropical Agricultural Research* 14:165-173.
Written Opinion dated Aug. 19, 2016, for PCT Application No. PCT/EP2016/066564, 9 pages.

* cited by examiner

Primary Examiner — Ralph J Gitomer
(74) *Attorney, Agent, or Firm* — Muriel Liberto, Esq.; Mintz Levin Cohn Ferris Glovsky and Popeo, P.C.

(57) ABSTRACT

The invention concerns a plant conditioning preparation comprising a (i) water based extract of plant A, especially belonging to the genus *Urtica*, (ii) an oil based extract of plant B, especially belonging to the genus *Salix*, and (iii) an emulsifier. The invention further comprises a process for the production of the said plant conditioning preparation and a method for using such a preparation. In addition, a plant conditioning preparation obtainable by said process as well as a method and a use of a plant conditioning preparation for enhancing the immune system of a plant are also disclosed.

16 Claims, No Drawings

PLANT CONDITIONING COMPOSITION COMPRISING WATER-BASED AND NATURAL OIL-BASED PLANT EXTRACTS

RELATED APPLICATIONS

This application is a national stage entry, filed under 35 U.S.C. § 371, of International Application No. PCT/EP2016/066564, filed on Jul. 12, 2016, which claims priority to Luxembourg Patent Application No. 92774, filed Jul. 13, 2015, the contents of which are hereby fully incorporated by reference.

FIELD OF THE INVENTION

The invention concerns a plant conditioning preparation comprising a water based extract of plant A, an oil based extract of plant B and an emulsifier. The invention further relates to a method for producing a plant conditioning preparation and a method for using such a preparation.

BACKGROUND OF THE INVENTION

The success of agriculture is affected by a number of different factors. Cultivated plants are often prone to attack by pests, viruses, bacteria and fungal diseases. In the search for a way of fighting such attacks over the last century, preparations containing synthetic chemical compounds have been developed. Such chemical compounds include chlorinated hydrocarbons (DDT, HCH), organic phosphoric-acid esters, compounds containing sulphur and phosphorus, and even toxic heavy metals (Bi, Hg, Tl), which were proven to be effective plant protection chemicals. This led to an increased use of chemical compounds in order to increase yield and at the beginning dramatic increases in yields were indeed observed.

This success led to a separate industrial branch to be formed dedicated to the discovery, development and preparation of more effective plant protection agents and preparations. Over the years, particularly in recent times, it has become increasingly evident that the agent residues and decomposition products found in the crops intended for feeding or for human consumption may have serious health consequences. This has led to an increased awareness and a need to control the use of plant protection agents.

The situation has been worsened by the resistance of the pests to plant protection agents, which has resulted in increased doses being required. There has been a need to provide new and more effective chemical compounds to overcome the developing problems. However, it has been recognized that part of the chemical plant protection agents accumulate in the plants, which are passed on when consumed by animals or humans, having potentially serious health damaging risks. As a consequence of the effects mentioned above, increasing regulations have been imposed and in some cases effective chemical plant protection agents were even banned in many countries. The search for alternative compositions for plant protection, which work within the new stringent regulations of recent years continues. There have been attempts to implement biotechnological methods to combat the problem, such as for the induction of viral resistance (see, e.g., HU 223 266), the use of a new strain of *Pseudomonas chlororaphis* bacterium as an active ingredient in the protection against plant diseases (see HU 220 582) and plant conditioning compositions of purely natural origin comprising extracts (WO 2010/150034). WO 2010/150034 found that effective plant protection preparations could only be produced by combining the extracts from no less than four different sorts of plants; i.e., willow, poplar, nut and nettle extract. All extracts from the four different plants were extracted in water. Such preparations suffer the drawbacks that they rely on extracts from many different natural sources, which can be very expensive, complicated to produce and less reliable due to the many processes required to obtain the end product.

It is known that some plant species can produce natural substances that provide protection against different pests. One known plant of this type is the white willow (*Salix alba*) belonging to the willows (Salicaceae). It was observed even by the American settlers dealing with basketry, that the steeping liquor enhancing the flexibility of the wicker was effective against some plant pests (see wintergreen oil, *betula* oil). Salicylic acid methyl ester could be identified as main active ingredient (see: [1] Organic Molecules in Action, Goodman, Morehouse, Gordon and Breach, 1973; [2] British Pharmaceutical Codex 1911: METHYLIS SALICYLAS; [3] FAO Nutrition Meetings Report Series No. 44A WHO/Food Add./68.33, Toxicological Evaluation of Same Flavouring Substances and Non-Nutritive Sweetening Agents). This has led to derivatives of salicylic acid being developed for use as plant protection agents, as can be seen in the patent applications HU 214 217 and HU 207 855.

Furthermore, it is also known that the concoction of the leaves of some nettles (Urticaceae) can be used for spraying horticultural plants. The main active ingredients of the concoction are: formic acid, tan substances, resins, nettle toxin, etc. For example patent applications HU 226 041 and HU 225 901 relate to the preparations containing among others nettle and these preparations are recommended for limited applications in fields, such as the cultivation of some plants and for the preparation of the soil.

The goal of this invention is to provide plant protection preparations that increase the resistance of a plant to diseases. It is a further goal to provide plant protection preparations that are practical and economical to produce and environmentally compatible.

SUMMARY OF THE INVENTION

The current invention provides a plant conditioning preparation comprising a water based extract of plant A, a natural oil based extract of plant B and an emulsifier. Plant conditioning preparations are preparations that improve the health and condition of a plant by, for example, boosting the plant's immune system. This effect is to be achieved with substances that are not harmful to human and animal health, nor to the environment. An extract in the meaning of the invention must be obtained by a solid-liquid extraction. The extract from the plant is obtained by using the extractant water or natural oil. Natural oils according to the invention are oils that are formed from natural sources, e.g. animal or plant oil, preferably plant oil. Synthetic, mineral oils, such as paraffinic oils are not part of the invention. The use of natural oils is advantageous over the use of synthetic mineral oils such as paraffinic oil for extraction as it is obtained from a natural source and is environmentally compatible. The use of a mixture of a water based plant extract and a natural oil based plant extract according to the invention has been found to have a synergistic effect, meaning that the effect is greater when the two extracts are used together than when the same two extracts are used sequentially.

According to one embodiment of the invention, the water based extract is obtained from plant A, wherein plant A is a plant from the family Urticaceae, which has stinging hairs, e.g., from the genus *Urtica* (nettles). For example, nettles selected from the group comprising *Urtica dioica, Urtica pilulifera, Urtica sondenii, Urtica urens, Urtica procera, Urtica membranacea* can be used. *Urtica dioica*, stinging nettle, is preferred. The whole nettle can be used for the extraction, but preferably, the parts growing above ground are used, e.g., leaves, stems and/or flowers. Preferably, the nettles are harvested in spring or summer.

According to another embodiment, the water based extract is obtained from plant A, wherein plant A is a plant from the family Phytolaccaceae. One member of the said family that is particularly preferred is *Phytolacca esculenta*.

According to another embodiment, the natural oil based extract is obtained from plant B, wherein plant B is selected from the family Salicaceae, in particular, the genus *Salix* (willows). For example, the willow may be selected from the group comprising *Salix alba, Salix amygdaloides, Salix fragilis, Salix boothi, Salix exigua, Salix babylonica, Salix purpurea*, preferably *Salix alba*. The parts of the willow that are to be used for the extraction step include leaves, stems and bark.

According to another embodiment, the natural oil based extract is obtained from plant B, wherein plant B is a plant from the family Polygonaceae, preferably from the genus *Fallopia*. Especially preferred is the member *Fallopia dumetorum*.

Preferably, the natural oil used to carry out the extraction is a plant oil selected from the list comprising sunflower oil, peanut oil, pumpkin oil, grape seed oil, linseed oil, olive oil, palm oil, rape seed oil and soybean oil. More preferably the natural oil used is sunflower oil. Sunflower oil provides an excellent extraction capacity.

Plant conditioning preparations according to the invention further comprise an emulsifying agent. Emulsifying agents are soluble in both fat/oil and water and enable fat or oil to be dispersed in water as an emulsion. Emulsifiers used in the current invention are compatible for use in foods. Preferably, naturally derived emulsifiers are used. Toxic emulsifiers, such as ATPlus™ 309, are not used as part of this invention. Food compatible emulsifiers of this invention include agar, albumin, alginates, casein, egg yolk, glycerol monostearate, gums, irish moss, lecithin, soaps, detergents and hydrolysed plant protein such as from cereals, corn, *soja* beans and rapeseed. Most preferably, emulsifiers of the invention are detergents and/or hydrolysed plant proteins.

Preferably, the plant conditioning preparation according to the invention contain extracts of plant A and B, but not any other plant extracts.

Preferably, the plant conditioning preparations according the invention comprise a water based nettle extract, a sunflower oil based willow extract and a detergent and/or hydrolysed plant proteins.

Alternatively, the preparation comprises a water based *Phytolacca esculenta* extract and a natural oil based *Fallopia dumetorum* extract and a detergent and/or hydrolysed plant proteins.

The plant conditioning preparations of the invention may contain at least 0.01% (w/w) salicylic acid. Preferably, the amount of salicylic acid contained in the plant conditioning preparation is at least 0.05% (w/w) salicylic acid, more preferably at least 0.07% (w/w), at least 0.09% (w/w), at least 0.11% (w/w), at least 0.13% (w/w), at least 0.15% (w/w), most preferably at least 0.2% (w/w).

Salicylic acid is a phenolic phytohormone that is found in plants. Salicylic acid is involved in plant growth and development, photosynthesis, transpiration, ion uptake and transport. The salicylic acid according to the invention may be derived from the nettle extract and optionally additionally introduced from other natural and/or non-natural sources, such as synthetic salicylic acid.

A plant conditioning preparation of the invention may contain at least 1% (w/w) methyl salicylate. Preferably the amount of methyl salicylate contained in the plant conditioning preparation is at least 1.3% (w/w), more preferably at least 1.6% (w/w), at least 1.9% (w/w), at least 2.2% (w/w), at least 2.5% (w/w), at least 2.8% (w/w), at least 3.0% (w/w) or most preferably at least 3.3% (w/w).

Methyl salicylate is an organic ester naturally produced in many species of plants. Methyl salicylate it said to act as a defense against herbivorous insects. Another use of methyl salicylate by plants is as a pheromone to warn other plants of pathogens. The methyl salicylate according to the invention may be derived from willow extract and optionally additionally introduced from other natural and/or non-natural sources, such as synthetic methyl salicylate.

In a preferred embodiment the plant conditioning preparation comprises willow extract and nettle extract containing at least 0.01% (w/w) salicylic acid and at least 1% (w/w) methyl salicylate.

In a preferred embodiment the plant conditioning preparation comprises a water based nettle extract, a sunflower oil based willow extract, a detergent and/or hydrolysed plant proteins, at least 0.01% (w/w) salicylic acid of the final product and at least 1% (w/w) methyl salicylate of the final product.

The plant conditioning preparations described herein may also comprise further components such as jasmonic acid.

A preferable method for the production of the preparation of the invention involves the steps of: 1) obtaining a water based extract of plant A, 2) obtaining a natural oil based extract of plant B and 3) mixing the product of steps 1) and 2) together in the presence of an emulsifier.

Optionally after step 1), the product is checked for the amount of salicylic acid present in the extract and the amount of salicylic acid is adjusted to at least 0.01% (w/w) of the final product.

Furthermore, optionally after step 2), the product is checked for the amount of methyl salicylate present in the extract and the amount of methyl salicylate is adjusted to a least 1% (w/w) of the final product.

The water based plant extract and the natural oil based plant extract are mixed to obtain the desired levels of salicylic acid and methyl salicylate, e.g. in a ratio of 1:18, or 1:16.5 or 1:14 or 1:12. Other components used during production may be hydrogen peroxide and/or mineral salts.

The advantage of this method is that effective plant conditioning preparations can be obtained from extraction of only two plants and their preparation may be cheaper over prior art forms. In some embodiments of the invention, the preparation is analysed and adjusted to a predetermined concentration of salicylic acid and/or methyl salicylate. This means that the preparation of such compositions may be simpler and more economical and reproducible.

Preferably, the salicylic acid and/or methyl salicylate is added to the mixture in the non-natural form, such as synthetic salicylic acid and/or synthetic methyl salicylate. In this way the preparations may remain economical.

The plant conditioning preparations of the invention are used for protecting a plant, such as boosting its immune system. The plant conditioning preparations of the inventions are used to prevent a plant from being infected, or to reduce symptoms of infection. They may also be used for treatment of a plat that is already infected. Preferably the plant is selected from the list of cereal, such as barley and winter wheat, sunflower, sugar beet, green pea, soybean, peas, leguminose, corn, oilseed rape, mustard, grapevine, stone fruit, such as peaches, plums and cherries, apple, pear, berries pepper, tomato, cabbage, potato garlic, carrot and sweet pepper.

The plant conditioning preparations of the invention are effective against many pathogens such as *Plasmopara viticola, Uncinula necator, Tetranychus urticeae, Phytophtora infestans, Alternaria solani, Leptinotarsa decemlineata, LevelHula taurica* and *Alternaria tenuis*.

The plant conditioning preparation of the invention may be diluted to 0.1 to 5%, 0.3 to 4%, 0.5 to 3%, 0.8 to 2% product in water, for example to a concentration of 4 litres of product in from 200 to 500 litres of water before application. The plant conditioning preparation of the invention may also be used as a 0.1 to 1% diluted water spray and preferably sprayed on the plant.

The preparations according to the invention may have an increased shelf-life in comparison to prior art forms. Also the spraying of the preparations according to the invention on the surface of leaves may lead to the plant cuticle becoming thicker and more resistant. The thickening of the plant cuticle may result in the manifestation of diseases in such plants to be lower than in untreated plants.

Manufacturing of the Water Based Nettle Extract

Dried nettle leaves (16 kg) are added to water (400 L) heated to 50 to 60° C. and stirred. Upon complete addition of the dried nettle leaves, the mixture is heated to 80 to 85° C. and stirred for a further 2-3 hours. The mixture is then left undisturbed to cool down slowly. The cooled mixture is then sedimented by centrifugation and filtered through a 250 micrometer textile filter cloth. Hydrogen peroxide is added to stabilise the mixture.

The filtered sample may be analysed for salicylic acid. Synthetic salicylic acid may then be added to obtain a standardised level.

Manufacturing of the Plant Oil Based Willow Extract

Dried chopped willow (36.8 kg) is added to sunflower oil (400 L) heated to 50 to 60° C. and stirred. Upon complete addition of the willow, the mixture is heated to 80 to 90° C. and stirred for a further 2-3 hours. The mixture is then left undisturbed to cool down slowly. After 2 days, the cooled mixture is then filtered through a 250 micrometer textile filter cloth.

The filtered sample may be analysed for methyl salicylate. Synthetic methyl salicylate may then be added to obtain a standardised level.

Manufacture of the Composition

The emulsifier is added to the plant oil based willow extract and the mixture is adjusted to pH 7 using a potassium phosphate solution. Water based nettle extract is then added and stirred for 15 minutes. The mixture may be diluted with oil and water to the appropriate concentration.

In the following, compositions are provided as non-limiting examples according to the invention.

EXAMPLE 1

| Ingredients | w/w % |
| --- | --- |
| Nettle extract (in water) | 1 |
| Willow extract (in sunflower oil) | 2.3 |
| Salicylic acid | 0.2 |
| Methyl salicylate | 2.8 |
| Detergent based emulsifier | 5.7 |

-continued

| Ingredients | w/w % |
| --- | --- |
| Sunflower oil | 37.7 |
| Water | 48.2 |
| Mineral salts (e.g. Ca, Mg, B, N, $P_2O_5$, $K_2O$) | 2.1 |

EXAMPLE 2

| Ingredients | % (w/w) |
| --- | --- |
| Nettle extract (in water) | 1 |
| Willow extract (in sunflower oil) | 2.4 |
| Salicylic acid | 0.2 |
| Methyl salicylate | 3.3 |
| Wheat protein based emulsifier | 3 |
| Sunflower oil | 38.1 |
| Water | 49.7 |
| Mineral salts (e.g. Ca, Mg, B, N, $P_2O_5$, $K_2O$) | 1.7 |

COMPARATIVE EXAMPLE

A plant conditioning preparation comprising 2.5% (w/w) of nettle extract in water, 2% (w/w) of willow extract in white oil and 12% (w/w) and ATPlus™ 309F emulsifier.

Experiments were carried out using the composition of Example 1, the composition of Example 2 and the composition of the comparative example on various different plants as described in the following.

The composition of Example 1 was diluted in water to 40 g/L of active ingredient and sprayed on a number of plants infested with pathogens. The plants and pathogens (in brackets) tested were grapevine (*Plasmopara viticola, Uncinula necator, Tetranychus urticeae*), potato (*Phytophtora infestans, Alternaria solani, Leptinotarsa decemlineata*), tomato (*Phytophtora infestans*) and sweet pepper (*LevelHula taurica* and *Alternaria tenuis*).

The plants were observed 5-8 days after treatment and the condition of the plant was noted. The same procedure was carried out using the composition of Example 2 and the composition of the comparative example.

In each case, the plants treated with the composition of Examples 1 and 2 were found to have waxier, healthier leaves, with a faster eradication of the pathogen than those treated with the composition of the comparative example.

The invention claimed is:

1. A plant conditioning preparation comprising a water based extract of plant A, a natural oil based extract of plant B and an emulsifier, wherein plant A is from the family Urticaceae and plant B is from the family Salicaceae, or wherein plant A is from the family Phytolaccaceae and plant B is from the family Polygonaceae.

2. The plant conditioning preparation according to claim 1, wherein plant A is from the genus *Urtica*.

3. The plant conditioning preparation of claim 1, wherein plant B is from the genus *Salix*.

4. The plant conditioning preparation of claim 1, wherein the emulsifier is food compatible.

5. The plant conditioning preparation of claim 1, wherein the emulsifier consists of a detergent and/or a hydrolysed plant protein.

6. The plant conditioning preparation of claim 1, wherein the natural oil is a plant oil selected from the group consisting of sunflower oil, peanut oil, pumpkin oil, grape seed oil, linseed oil, olive oil, palm oil, rape seed oil and soybean oil.

7. The plant conditioning preparation of claim 1, wherein the natural oil is sunflower oil.

8. The plant conditioning preparation of claim 1 comprising at least 0.01% (w/w) salicylic acid and/or at least 1% (w/w) methyl salicylate.

9. The plant conditioning preparation of claim 1 comprising a water based extract of *Urtica dioica*, a sunflower oil based *Salix alba* extract, a detergent and/or hydrolysed plant proteins, at least 0.01% (w/w) salicylic acid and at least 1% (w/w) methyl salicylate.

10. A process for the production of a plant conditioning preparation comprising a water based extract of plant A, a natural oil based extract of plant B, and an emulsifier, wherein plant A is from the family Urticaceae and plant B is from the family Salicaceae, or wherein plant A is from the family Phytolaccaceae and plant B is from the family Polygonaceae, the process comprising the steps of
   1) obtaining a water based extract of plant A;
   2) obtaining a natural oil based extract of plant B; and
   3) mixing the product of steps 1) and 2) together in the presence of an emulsifier.

11. The process of claim 10 further comprising the steps of:
   checking the product of step 1) for the amount of salicylic acid present in the extract and adjusting the amount of salicylic acid to at least 0.01% (w/w) of the final product;
   and/or checking the product of step 2) for the amount of methyl salicylate present in the extract and adjusting the amount of methyl salicylate to at least 1% (w/w) of the final product.

12. A method of enhancing the immune system of a plant, preventing an infection by a pathogen, or treating a plant infected by a pathogen, by applying to the plant a preparation comprising a water based extract of plant A, a natural oil based extract of plant B, and an emulsifier, wherein plant A is from the family Urticaceae and plant B is from the family Salicaceae, or wherein plant A is from the family Phytolaccaceae and plant B is from the family Polygonaceae.

13. The method of claim 12 wherein the plant is selected from the group consisting of cereal, sunflower, sugar beet, green pea, soybean, peas, leguminose, corn, oilseed rape, mustard, grapevine, stone fruit, apple, pear, berries pepper, tomato, cabbage, potato garlic, carrot and sweet pepper.

14. The method of claim 12, wherein the pathogen is selected from the group consisting of *Plasmopara viticola, Uncinula necator, Tetranychus* urticeae, *Phytophtora infestans, Alternaria solani, Leptinotarsa decemlineata, Leveillula taurica* and *Alternaria tenuis*.

15. The method of claim 13, wherein the cereal is barley or winter wheat.

16. The method of claim 13, wherein the stone fruit is selected from peaches, plums, and cherries.

* * * * *